United States Patent
Jindal et al.

(10) Patent No.: US 10,819,783 B1
(45) Date of Patent: Oct. 27, 2020

(54) MANAGING A DATA PACKET FOR AN OPERATING SYSTEM ASSOCIATED WITH A MULTI-NODE SYSTEM

(71) Applicant: Ampere Computing LLC, Santa Clara, CA (US)

(72) Inventors: Ankit Jindal, Pune (IN); Pranavkumar Sawargaonkar, Pune (IN); Keyur Chudgar, San Jose, CA (US)

(73) Assignee: AMPERE COMPUTING LLC, Santa Clara, CA (US)

( * ) Notice: Subject to any disclaimer, the term of this patent is extended or adjusted under 35 U.S.C. 154(b) by 568 days.

(21) Appl. No.: 15/250,966

(22) Filed: Aug. 30, 2016

(51) Int. Cl.
*G06F 15/173* (2006.01)
*H04L 29/08* (2006.01)
*G06F 9/455* (2018.01)
*G06F 9/48* (2006.01)

(52) U.S. Cl.
CPC ...... H04L 67/1095 (2013.01); G06F 9/45558 (2013.01); G06F 9/4812 (2013.01); *G06F 2009/4557* (2013.01); *G06F 2009/45579* (2013.01); *G06F 2009/45583* (2013.01)

(58) Field of Classification Search
CPC ............... H04L 67/06; H04L 67/2842
See application file for complete search history.

(56) References Cited

U.S. PATENT DOCUMENTS

| | | | |
|---|---|---|---|
| 5,226,039 A | 7/1993 | Frank et al. | |
| 5,282,201 A | 1/1994 | Frank et al. | |
| 5,341,483 A | 8/1994 | Frank et al. | |
| 5,541,955 A | 7/1996 | Jacobsmeyer | |
| 5,754,764 A | 5/1998 | Davis et al. | |
| 6,947,971 B1 | 9/2005 | Amos | |
| 9,385,843 B2 | 7/2016 | Khandekar et al. | |
| 2005/0005075 A1* | 1/2005 | Landin | G06F 12/0817 711/148 |
| 2015/0117223 A1* | 4/2015 | Lih | H04L 12/437 370/238 |

* cited by examiner

*Primary Examiner* — Yves Dalencourt
(74) *Attorney, Agent, or Firm* — Alston & Bird LLP

(57) ABSTRACT

Various aspects provide for managing memory in virtual computer system. For example, a system can include a first network node and a second network node. The first network node receives a data packet via a first hardware network controller. The first network node also transmits the data packet over a communication channel via a second hardware network controller in response to a determination that memory data for the data packet is not mapped to the first network node. The second network node receives the data packet via the communication channel and provides the data packet to an operating system associated with the first network node and the second network node.

20 Claims, 10 Drawing Sheets

US 10,819,783 B1

MANAGING A DATA PACKET FOR AN OPERATING SYSTEM ASSOCIATED WITH A MULTI-NODE SYSTEM

TECHNICAL FIELD

The subject disclosure relates generally to virtual computer systems, and more particularly to providing memory coherency across a multi-node network system.

BACKGROUND

A virtual computer is a software computer environment that emulates a hardware computer environment. For example, a hypervisor associated with a virtual computer can emulate a central processing unit and/or other hardware components. In a virtual computer system, an operating system that manages a virtual computer environment can be maintained by a first network node associated with a first processor core. The first network node can receive data packets from a network and provide the data packets to the operating system that manages the virtual computer environment. A second network node associated with a second processor core can also be employed to provide memory page data for the data packet when the data packet is not mapped to the first network node. However, the first network node is required to wait a certain amount of time before receiving the memory page data from the second network node, thereby reducing performance of the first network node and/or the virtual computer system.

The above-described description is merely intended to provide a contextual overview of current virtual computer systems and/or current network systems and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

In an example embodiment, a system comprises a first network node and a second network node. The first network node is configured for receiving a data packet via a first hardware network controller. The first network node is also configured for transmitting the data packet over a communication channel via a second hardware network controller in response to a determination that memory data for the data packet is not mapped to the first network node. The second network node is configured for receiving the data packet via the communication channel. The second network node is also configured for providing the data packet to an operating system associated with the first network node and the second network node.

In another example embodiment, a method provides for receiving a data packet via a first network device of a network system. In response determining that memory data for the data packet is mapped to the first network device, the method provides for providing the data packet to an operating system via the first network device. Furthermore, in response to determining that the memory data for the data packet is not mapped to the first network device, the method provides for transmitting the data packet to a second network device of the network system to facilitate providing the data packet to the operating system via the second network device.

In yet another example embodiment, a network device comprises a network interface controller and a virtual machine manager. The network interface controller is configured for receiving a data packet and generating an interrupt signal in response to storing the data packet in a memory buffer. The virtual machine manager is configured for receiving the interrupt signal, providing the data packet to an operating system associated with the network device in response to a determination that a memory page for the data packet is mapped to the network device, and facilitating transmission of the data packet to another network device in response to a determination that the memory page for the data packet is not mapped to the network device.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
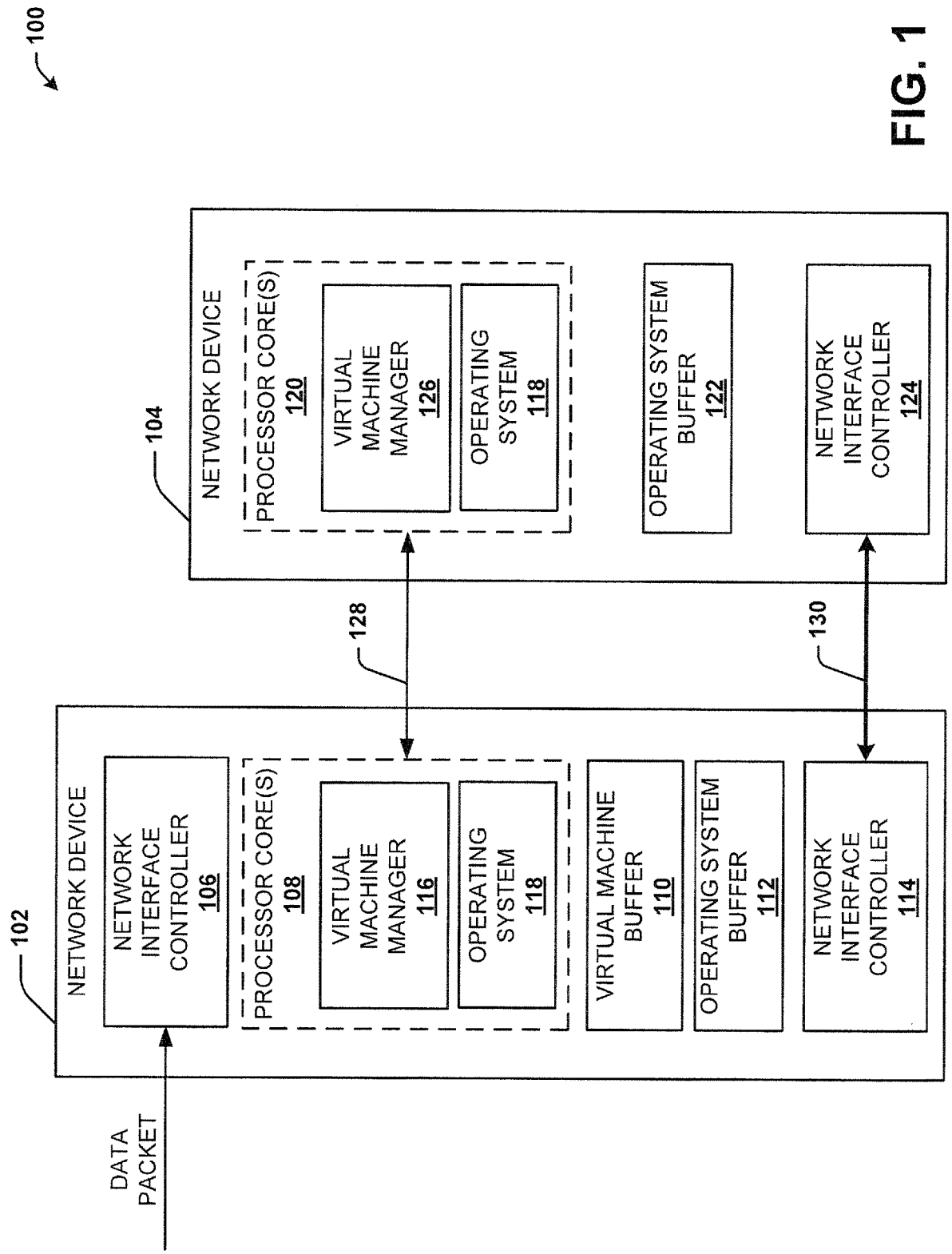
FIG. 1 is a block diagram illustrating an example, non-limiting embodiment of a multi-node system associated with a receiver in accordance with various aspects described herein.

The disclosure herein is described with reference to the drawings, wherein like reference numerals are used to refer to like elements throughout. In the following description, for purposes of explanation, numerous specific details are set forth in order to provide a thorough understanding of the subject innovation. It may be evident, however, that various disclosed aspects can be practiced without these specific details. In other instances, well-known structures and devices are shown in block diagram form in order to facilitate describing the subject innovation.

In a network system (e.g., a virtual computer network system), a network device can receive a data packet and copy the data packet into a buffer (e.g., a memory buffer). After the data packet is stored in the buffer, the network device (e.g., a hypervisor component of the network device) can perform a process to copy the data packet into another buffer for an operating system associated with a virtual computer environment. For example, the network device (e.g., the hypervisor component of the network device) can determine whether an operating system buffer page for the data packet is mapped to a network device or not. If the operating system buffer page is mapped to the network device, then the data packet can be copied to the other buffer for the operating system. However, if the operating system buffer page is not mapped to the network device, then a page request command can be issued and transmitted to a remote network device. The network device can then wait for the operating system buffer page to be received from the remote network device. Once the operating system buffer page is received by the network device, the data packet can be copied to the other buffer for the operating system. However, an amount of time to wait for the operating system buffer page to be received from the remote network device can introduce high latency (e.g., delay) to the network system and/or can reduce performance of the network system. Furthermore, in general, the network device that receives the data packet always provides the data packet to the operating system.

To address these and/or other issues, various aspects of the present disclosure provide an improved multi-node network system (e.g., a multi-node virtual computer network system). For example, memory coherency can be provided, latency can be reduced and/or performance can be improved across the multi-node network system (e.g., the multi-node virtual computer network system). In an aspect, an operating system associated with a virtual computer environment can be distributed across at least a first network node (e.g., a first network device) and a second network node (e.g., a second network device). The first network node and the second network node can include network interface controller(s), processor core(s) and a virtual machine manager. In an aspect, a data packet received by the first network node can be provided to the operating system (e.g., the operating system associated with the virtual computer environment) by either the first network node or the second network node. For example, in response to a determination that a memory page (e.g., an operating system buffer page) for the data packet is mapped to the first network node, the first network node can provide the data packet to the operating system (e.g., the operating system that is distributed across the first network node and the second network node). However, in response to a determination that a memory page (e.g., an operating system buffer page) for the data packet is not mapped to the first network node, the first network node can transmit the data packet to the second network node and the second network node can provide the data packet to the operating system (e.g., the operating system that is distributed across the first network node and the second network node). Therefore, memory page data (e.g., operating system buffer page data) is not transmitted between the first network node and the second network node (e.g., transfer of operating system pages for transmitter packet buffers and receiver packet buffers can be completely removed from a network process). Accordingly, latency (e.g., average packet receive latency) associated with the multi-node network system can be reduced and/or performance of the multi-node network system can be improved.

Turning now to FIG. 1, a block diagram illustrating an example, non-limiting embodiment of a system 100 in accordance with various aspects described herein is shown. The system 100 can be a multi-node system (e.g., a multi-node coherent system) and/or a network system (e.g., a virtual computer network system) that includes at least a network device 102 and a network device 104. The network device 102 can be a first system on a chip (SoC) and the network device 104 can be a second SoC. Furthermore, the system 100 can be associated with and/or included in a receiver device. In one example, the system 100 can be associated with a virtual network system. The system 100 can be employed by various systems, such as, but not limited to a data center system, a data mining system, a real-time analytics system, a machine learning system, a predictive analysis system, a media content system, a content management system, a computer network system, a communication system, a router system, a server system, a high availability server system (e.g., Telecom server systems), a Web server system, a disk array system, a powered insertion board system, a cloud-based system, and/or another type of system. It is to be appreciated that the system 100 can include more than two network devices. For example, in certain implementations, the system 100 can include four network devices, the system 100 can include eight network devices, etc.

The network device 102 can include at least a network interface controller 108, processor core(s) 108, a virtual machine buffer 110, an operating system buffer 112 and/or a network interface controller 114. The processor cores(s) 108 can be associated with at least a virtual machine manager 116 and/or an operating system 118. The network device 104 can include at least processor core(s) 120, an operating system buffer 122 and/or a network interface controller 124. The processor cores(s) 120 can be associated with at least a virtual machine manager 126. The operating system 118 can be distributed on the processor core(s) 108 of network device 102 and the processor core(s) 120 of the network device 104. Therefore, the processor cores(s) 120 can also be associated with the operating system 118. The operating system 118 can be associated with a virtual computer environment. In one example, the network device 102 can be a first node (e.g., a first network node) of a network system and the network device 104 can be a second node (e.g., a second network node) of a network system.

The network device 102 can receive a data packet (e.g., DATA PACKET shown in FIG. 1). For example, the network interface controller 106 of the network device 102 can receive the data packet. The data packet can be associated with a network (e.g., an external network, an outside network, etc.). For instance, the data packet can be transmitted to the network device 102 via a network (e.g., an external network, an outside network, etc.). In one example, the data packet can be transmitted to the network device 102 via a coherent optical network. The network interface controller 106 can be a hardware controller (e.g., an Ethernet hardware controller).

The network interface controller 106 can copy the data packet to the virtual machine buffer 110. The virtual machine buffer 110 can be, for example, a hypervisor buffer (e.g., a pre-programmed hypervisor buffer) associated with the virtual machine manager 116. The virtual machine manager 116 can be a hypervisor (e.g., computer software or computer firmware) that creates and/or runs a virtual machine (e.g., a virtual machine environment) associated with the operating system 118. In one example, the virtual machine manager 116 can be a hypervisor associated with an interconnect technology that enables at least the network device 102 and the network device 104 to be connected. The processor core(s) 108 can be in communication with the processor core(s) 120 via a communication channel 128. For example, the virtual machine manager 116 and the virtual machine manager 126 can be in communication via the communication channel 128. The communication channel 128 can be associated with a physical transport layer (e.g., a physical transport layer protocol). Additionally or alternatively, the operating system 118 can be distributed between the processor core(s) 108 and the processor core(s) 120 via the communication channel 128. For example, a first portion of the operating system 118 can be maintained by the network device 102 (e.g., the processor core(s) 108) and a second portion of the operating system 118 can be maintained by the network device 104 (e.g., the processor core(s) 120). The network interface controller 106 can also generate an interrupt signal in response to copying the data packet to the virtual machine buffer 110. The network interface controller 106 can transmit the interrupt signal to the virtual machine manager 116. In response to receiving the interrupt signal, the virtual machine manager 116 can manage and/or analyze the data packet stored in the virtual machine buffer 110.

In an aspect, in response to receiving the interrupt signal, the virtual machine manager 116 can determine whether memory data for the data packet is mapped to the network device 102. For example, in response to receiving the interrupt signal, the virtual machine manager 116 can determine whether a memory page for the data packet is mapped to the network device 102. The memory page can be, for example, a buffer page associated with the operating system 118 (e.g., the buffer page can be an operating system buffer page for the data packet). In another example, in response to receiving the interrupt signal, the virtual machine manager 116 can determine whether a virtual machine associated with the data packet is mapped to the network device 102 (e.g., whether a virtual machine associated with the data packet is executed and/or managed by the processor core(s) 108). In an implementation, to facilitate determining whether the memory data is mapped to the network device 102, the virtual machine manager 116 can translate a virtual address associated with the data packet into a physical address. The physical address of the data packet can then be compared to a physical memory map for the network device 102 to determine whether the data packet is mapped to the network device 102. Therefore, the virtual machine manager 116 can employ the physical memory map for the network device 102 to determine whether the memory data is mapped to the network device 102.

In response to a determination by the virtual machine manager 116 that the memory data is mapped to the network device 102, the virtual machine manager 116 can copy the data packet to the operating system buffer 112 (e.g., the data packet can be stored in the operating system buffer 112). For example, in response to a determination by the virtual machine manager 116 that the memory data is mapped to the network device 102, the network device 102 (e.g., the virtual machine manager 116) can provide the data packet to the operating system 118. However, in response to a determination by the virtual machine manager 116 that the memory data is not mapped to the network device 102, the virtual machine manager 116 can facilitate transmission of the data packet to the network device 104 via a communication channel 130. For example, in response to a determination by the virtual machine manager 116 that the memory data is not mapped to the network device 102, the network interface controller 114 can transmit the data packet to the network device 104 via the communication channel 130.

The network interface controller 114 can be coupled to the network interface controller 124 via the communication channel 130. The communication channel 130 can be a network communication channel (e.g., an Ethernet communication channel). In one example, the communication channel 130 can be a physical connection between the network interface controller 114 and the network interface controller 124. Furthermore, the network interface controller 114 can be a hardware controller (e.g., an Ethernet hardware controller) and the network interface controller 124 can be another hardware controller (e.g., another Ethernet hardware controller). In one example, the communication channel 130 can be a fiber optic connection (e.g., a 10G fiber optic connection) between the network interface controller 114 and the network interface controller 124. In another example, the communication channel 130 can create a network tunnel between the network interface controller 114 and the network interface controller 124 (e.g., the data packet can be encapsulated and transmitted between the network interface controller 114 and the network interface controller 124).

In response to receiving the data packet from the network device 102, the network device 104 can copy the data packet to the operating system buffer 122 (e.g., the data packet can be stored in the operating system buffer 122) since the data packet is already mapped to the network device 104. In response to the data packet being stored in the operating system buffer 122, the network device 104 can inform the operating system 118 that the data packet is received and that memory coherency is achieved across the network device 102 and the network device 104. Therefore, in response to the data packet being stored in the operating system buffer 122, the data packet can be employed by the operating system 118. In an aspect, the network device 104 can provide status data for the data packet to the network device 102 in response to the providing the data packet to the operating system 118. For example, the status data can inform the network device 102 that the data packet is received by the network device 104 and/or being processed by the network device 104. In response to the data packet being stored in the operating system buffer 122 and/or the status data being received by the network device 102, a new data packet can be received and/or analyzed by the network device 102. In another aspect, the network interface controller 106, the network interface controller 114 and/or the network interface controller 124 can maintain information regarding the system 100 to facilitate transmission of a data packet such as, but not limited to, number of network devices in the system 100 (e.g., number of network nodes in the system 100), number of active network devices in the system 100, network addresses for each network device in the system 100, other information regarding the system 100, etc.

Figure 2:
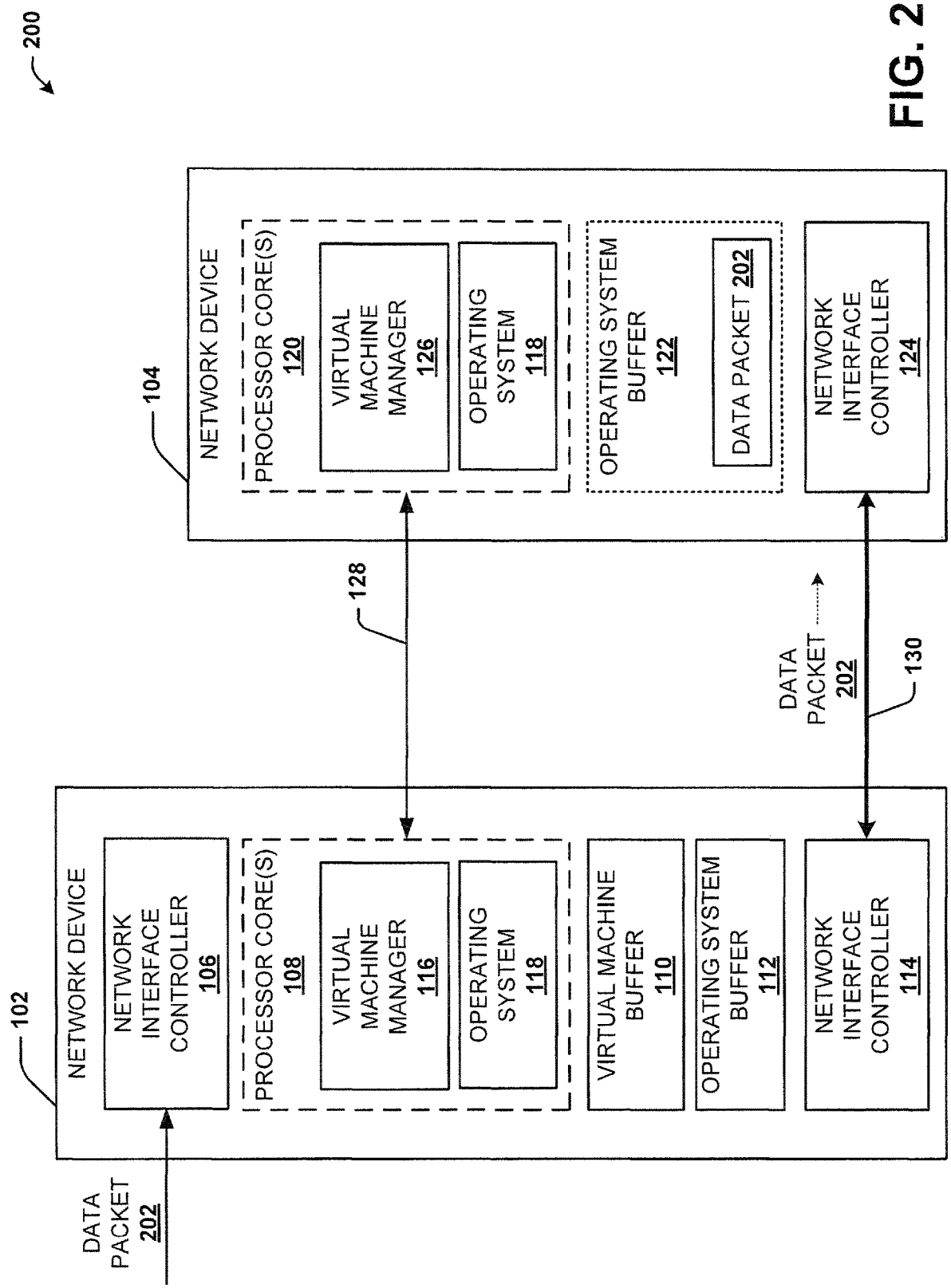
FIG. 2 is a block diagram illustrating another example, non-limiting embodiment of a multi-node system associated with a receiver in accordance with various aspects described herein.

FIG. 2 is a block diagram illustrating an example, non-limiting embodiment of a system 200 in accordance with various aspects described herein is shown. The system 200 can be an embodiment of network system that includes at least the network device 102 and the network device 104. The network device 102 can include at least the network interface controller 108, the processor core(s) 108, the virtual machine buffer 110, the operating system buffer 112 and/or the network interface controller 114. The processor cores(s) 108 can be associated with at least the virtual machine manager 116 and/or the operating system 118. The network device 104 can include at least the processor core(s) 120, the operating system buffer 122 and/or the network interface controller 124. The processor cores(s) 120 can be associated with at least the virtual machine manager 126 and/or the operating system 118.

The network device 102 can receive a data packet 202. The data packet 202 can, for example, correspond to the data packet described in connection with FIG. 1. For example, the data packet 202 can be associated with a network (e.g., an external network, an outside network, etc.). In an embodiment where the network device 102 (e.g., the virtual machine manager 116) determines that memory data (e.g., a memory page, a buffer page, an operating buffer page, etc.) for the data packet 202 is not mapped to the network device 102, the network interface controller 114 of the network device 102 can transmit the data packet to the network device 104 via the communication channel 130. For example, in response to a determination that memory data (e.g., a memory page, a buffer page, an operating buffer page, etc.) for the data packet 202 is not mapped to the network device 102, the network interface controller 114 of the network device 102 can transmit the data packet to the network device 104 via the communication channel 130 rather than providing (e.g., handing off) the data packet 202 to the operating system 118 associated with the network device 102. The network interface controller 124 of network device 104 can receive the data packet 202 from the network device 102. In response to receiving the data packet 202, the network device 104 can store the data packet 202 in the operating system buffer 122 without determining whether memory data (e.g., a memory page, a buffer page, an operating buffer page, etc.) for the data packet 202 is mapped to the network device 104. The network device 104 can also inform the operating system 118 that the data packet 202 is stored in the operating system buffer 122. For example, in response to receiving the data packet 202, the network device 104 can provide (e.g., hand off) the data packet 202 to the operating system 118 associated with the network device 104.

Figure 3:
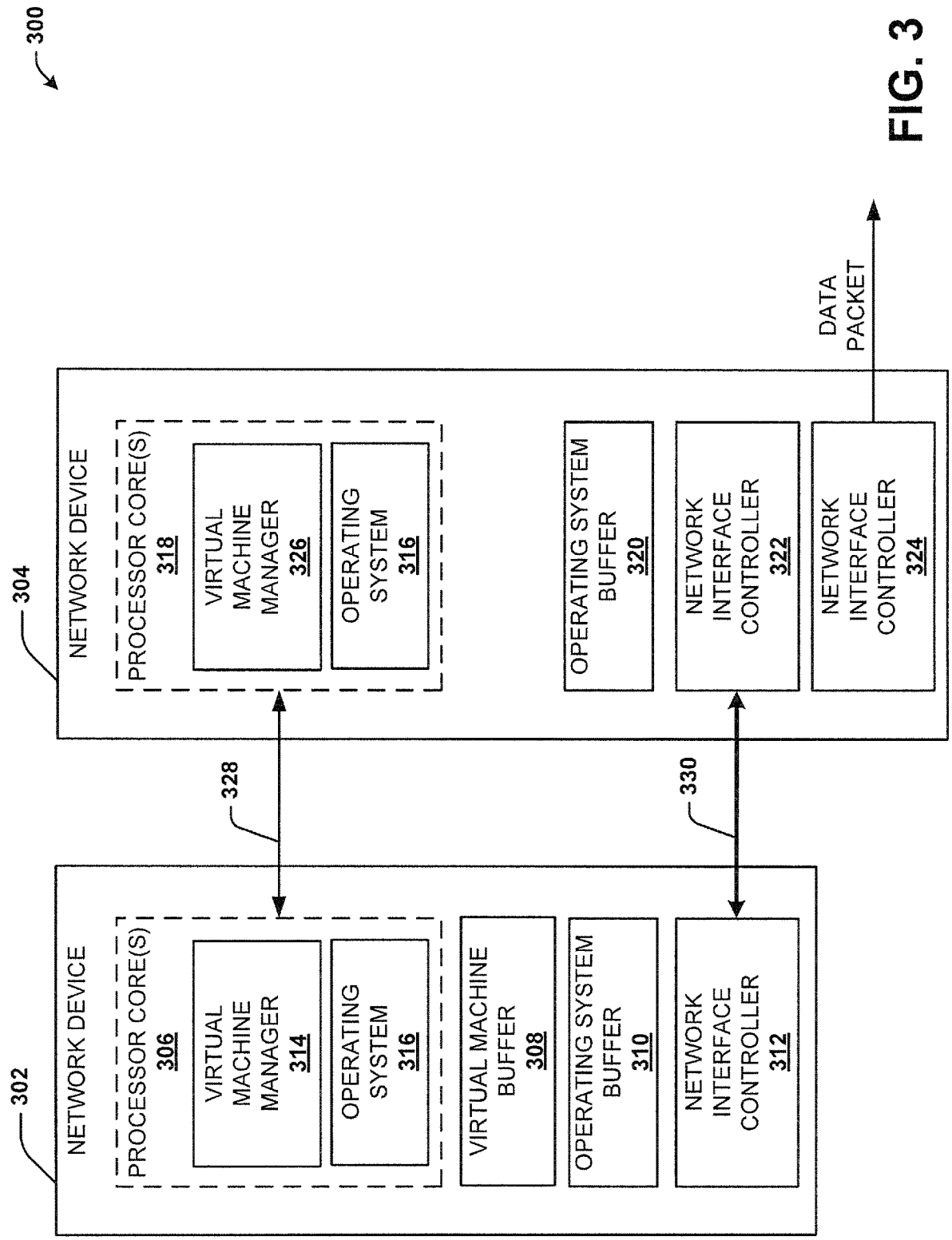
FIG. 3 is a block diagram illustrating an example, non-limiting embodiment of a multi-node system associated with a transmitter in accordance with various aspects described herein.

Referring now to FIG. 3, a block diagram illustrating an example, non-limiting embodiment of a system 300 in accordance with various aspects described herein is shown. The system 300 can be a multi-node system (e.g., a multi-node coherent system) and/or a network system (e.g., a virtual computer network system) that includes at least a network device 302 and a network device 304. The network device 302 can be a first SoC and the network device 304 can be a second SoC. Furthermore, the system 300 can be associated with and/or included in a transmitter device. In one example, the system 300 can be associated with a virtual network system. The system 300 can be employed by various systems, such as, but not limited to a data center system, a data mining system, a real-time analytics system, a machine learning system, a predictive analysis system, a media content system, a content management system, a computer network system, a communication system, a router system, a server system, a high availability server system (e.g., Telecom server systems), a Web server system, a disk array system, a powered insertion board system, a cloud-based system, and/or another type of system. It is to be appreciated that the system 300 can include more than two network devices. For example, in certain implementations, the system 300 can include four network devices, the system 300 can include eight network devices, etc.

The network device 302 can include at least processor core(s) 306, a virtual machine buffer 308, an operating system buffer 310 and/or a network interface controller 312. The processor cores(s) 306 can be associated with at least a virtual machine manager 314 and/or an operating system 316. The network device 304 can include at least processor core(s) 318, an operating system buffer 320, a network interface controller 322 and/or a network interface controller 324. The processor cores(s) 318 can be associated with at least a virtual machine manager 326. The operating system 316 can be distributed on the processor core(s) 306 of network device 302 and the processor core(s) 318 of the network device 304. For example, a first portion of the operating system 316 can be maintained by the network device 302 (e.g., the processor core(s) 306) and a second portion of the operating system 316 can be maintained by the network device 304 (e.g., the processor core(s) 318). Therefore, the processor cores(s) 318 can also be associated with the operating system 316. The operating system 316 can be associated with a virtual computer environment. In one example, the network device 302 can be a first node of a network system and the network device 304 can be a second node of a network system.

In an embodiment, the operating system 316 associated with the network device 302 and/or another component of the network device 302 (e.g., a virtual machine associated with the network device, the processor core(s) 306 of the network device 302) can generate a data packet. The data packet can be a data packet for transmission via a network (e.g., an external network, an outside network, etc.) in communication with the network device 302 and the network device 304. The virtual machine manager 314 can copy the data packet to the virtual machine buffer 308. The virtual machine buffer 308 can be, for example, a hypervisor buffer (e.g., a pre-programmed hypervisor buffer) associated with the virtual machine manager 314. The virtual machine manager 314 can be a hypervisor (e.g., computer software or computer firmware) that creates and/or runs a virtual machine (e.g., a virtual machine environment) associated with the operating system 316. In one example, the virtual machine manager 314 can be a hypervisor associated with an interconnect technology that enables at least the network device 302 and the network device 304 to be connected. The processor core(s) 306 can be in communication with the processor core(s) 318 via a communication channel 328. For example, the virtual machine manager 314 and the virtual machine manager 326 can be in communication via the communication channel 328. The communication channel 328 can be associated with a physical transport layer (e.g., a physical transport layer protocol). Additionally or alternatively, the operating system 316 can be distributed between the processor core(s) 306 and the processor core(s) 318 via the communication channel 328.

In an aspect, in response to copying the data packet to the virtual machine buffer 308, the virtual machine manager 314 can determine whether memory data for the data packet is mapped to the network device 302. For example, in response to copying the data packet to the virtual machine buffer 308, the virtual machine manager 314 can determined whether a memory page for the data packet is mapped to the network device 302. The memory page can be, for example, a buffer page associated with the operating system 316 (e.g., the buffer page can be an operating system buffer page for the data packet). In another example, in response to copying the data packet to the virtual machine buffer 308, the virtual machine manager 314 can determine whether a virtual machine associated with the data packet is mapped to the network device 302 (e.g., whether a virtual machine associated with the data packet is executed and/or managed by the processor core(s) 306). In an implementation, to facilitate determining whether the memory data is mapped to the network device 302, the virtual machine manager 314 can translate a virtual address associated with the data packet into a physical address. The physical address of the data packet can then be compared to a physical memory map for the network device 302 to determine whether the data packet is mapped to the network device 302. Therefore, the virtual machine manager 314 can employ the physical memory map for the network device 302 to determine whether the memory data is mapped to the network device 302.

In response to a determination by the virtual machine manager 314 that the memory data is mapped to the network device 302, the virtual machine manager 314 can copy the data packet to the operating system buffer 310 (e.g., the data packet can be stored in the operating system buffer 310). For example, in response to a determination by the virtual machine manager 314 that the memory page is mapped to the network device 302, the network device 302 (e.g., the virtual machine manager 314) can provide the data packet to the operating system 316. However, in response to a determination by the virtual machine manager 314 that the memory data is not mapped to the network device 302, the virtual machine manager 314 can facilitate transmission of the data packet to the network device 304 via a communication channel 330. For example, in response to a determination by the virtual machine manager 314 that the memory data is not mapped to the network device 302, the network interface controller 312 can transmit the data packet to the network device 304 via the communication channel 330.

The network interface controller 312 can be coupled to the network interface controller 324 via the communication channel 330. The communication channel 330 can be a network communication channel (e.g., an Ethernet communication channel). In one example, the communication channel 330 can be a physical connection between the network interface controller 312 and the network interface controller 324. Furthermore, the network interface controller 312 can be a hardware controller (e.g., an Ethernet hardware controller) and the network interface controller 324 can be another hardware controller (e.g., another Ethernet hardware controller). In one example, the communication channel 330 can be a fiber optic connection (e.g., a 10G fiber optic connection) between the network interface controller 312 and the network interface controller 322. In another example, the communication channel 330 can create a network tunnel between the network interface controller 312 and the network interface controller 322 (e.g., the data packet can be encapsulated and transmitted between the network interface controller 312 and the network interface controller 322).

In response to receiving the data packet from the network device 302, the network device 304 can copy the data packet to the operating system buffer 320 (e.g., the data packet can be stored in the operating system buffer 320) since the data packet is already mapped to the network device 304. In response to the data packet being stored in the operating system buffer 320, the network device 304 can inform the operating system 316 that the data packet is received and that memory coherency is achieved across the network device 302 and the network device 304. Additionally or alternatively, in response to the data packet being stored in the operating system buffer 320, the network device 304 can transmit the data packet (e.g., DATA PACKET shown in FIG. 3). For example, the network interface controller 324 of the network device 304 can transmit the data packet. The data packet can be transmitted via a network (e.g., an external network, an outside network, etc.). For instance, the network interface controller 324 can transmit the data packet via a network (e.g., an external network, an outside network, etc.). In one example, the network interface controller 324 can transmit the data packet via a coherent optical network. The network interface controller 324 can be a hardware controller (e.g., an Ethernet hardware controller). Therefore, in response to the data packet being stored in the operating system buffer 320 and/or in response to the data packet being stored in the operating system buffer 320, the data packet can be employed by the operating system 316. Furthermore, in response to the data packet being stored in the operating system buffer 320 and/or in response to the data packet being stored in the operating system buffer 320, a new data packet can be processed by the network device 302. In another aspect, the network interface controller 312, the network interface controller 322 and/or the network interface controller 324 can maintain information regarding the system 300 to facilitate transmission of a data packet such as, but not limited to, number of network devices in the system 300 (e.g., number of network nodes in the system 300), number of active network devices in the system 300, network addresses for each network device in the system 300, other information regarding the system 300, etc.

Figure 4:
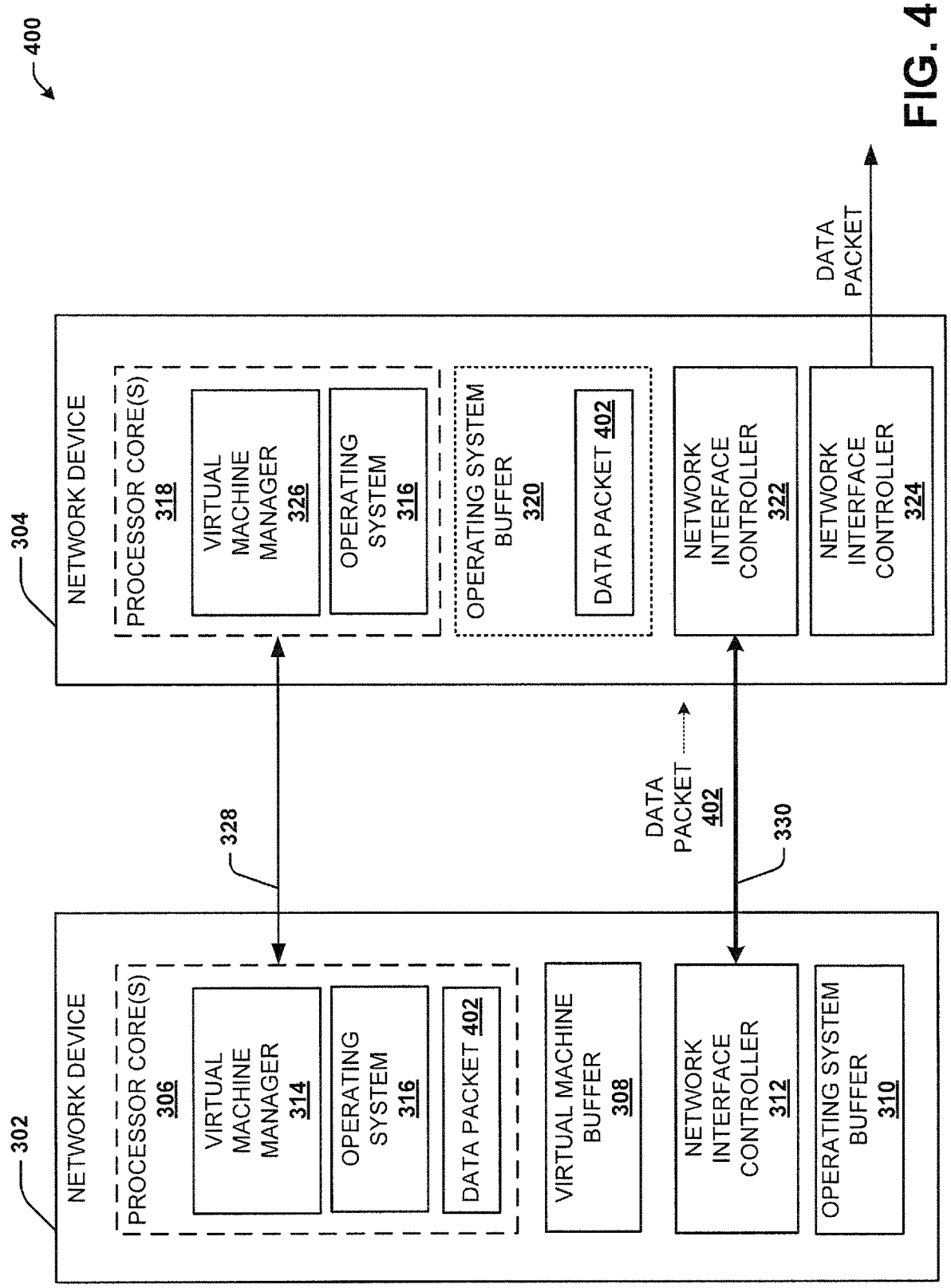
FIG. 4 is a block diagram illustrating another example, non-limiting embodiment of a multi-node system associated with a transmitter in accordance with various aspects described herein.

FIG. 4 is a block diagram illustrating an example, non-limiting embodiment of a system 400 in accordance with various aspects described herein is shown. The system 400 can be an embodiment of network system that includes at least the network device 302 and the network device 304. The network device 302 can include at least the processor core(s) 306, the virtual machine buffer 308, the operating system buffer 310 and/or the network interface controller 312. The processor cores(s) 306 can be associated with at least the virtual machine manager 314 and/or the operating system 316. The network device 304 can include at the least processor core(s) 318, the operating system buffer 320, the network interface controller 322 and/or the network interface controller 324. The processor cores(s) 318 can be associated with at least the virtual machine manager 326 and/or the operating system 316.

The network device 302 can generate a data packet 402. The data packet 402 can, for example, correspond to the data packet described in connection with FIG. 3. For instance, the data packet 402 can be generated by the processor core(s) 306. In one example, the data packet 402 can be generated by the operating system 316 associated with the network device 302. In another example, the data packet 402 can be generated by a virtual machine associated with the processor core(s) 306. In an embodiment where the network device 302 (e.g., the virtual machine manager 314) determines that memory data (e.g., a memory page, a buffer page, an operating buffer page, etc.) for the data packet 402 is not mapped to the network device 302, the network interface controller 312 of the network device 302 can transmit the data packet to the network device 304 via the communication channel 330. For example, in response to a determination that memory data (e.g., a memory page, a buffer page, an operating buffer page, etc.) for the data packet 402 is not mapped to the network device 302, the network interface controller 312 of the network device 302 can transmit the data packet to the network device 304 via the communication channel 330 rather than transmitting the data packet 402. The network interface controller 322 of network device 304 can receive the data packet 402 from the network device 302. In response to receiving the data packet 402, the network device 304 can store the data packet 402 in the operating system buffer 320 without determining whether memory data (e.g., a memory page, a buffer page, an operating buffer page, etc.) for the data packet 402 is mapped to the network device 104. The network device 304 (e.g., the network interface controller 324) can also transmit the data packet 402. For example, network device 304 (e.g., the network interface controller 324) can transmit the data packet 402 via a network (e.g., an external network, an outside network, etc.).

Aspects of the systems, apparatuses or processes explained in this disclosure can constitute machine-executable components) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an implementation, the virtual machine manager 116, the virtual machine manager 126, the virtual machine manager 314 and/or the virtual machine manager 326 can constitute machine-executable component(s) and instructions embodied within a memory associated with processor core(s) (e.g., the processor core(s) 108, the processor core(s) 120, the processor core(s) 306 and/or the processor core(s) 318). For example, processor core(s) (e.g., the processor core(s) 108, the processor core(s) 120, the processor core(s) 306 and/or the processor core(s) 318) can facilitate operation of the instructions (e.g., computer executable components and instructions) by the system 100, the system 200, the system 300 and/or the system 400.

In view of the example systems described above, methods that may be implemented in accordance with the described subject matter may be better appreciated with reference to the flow charts of FIGS. 5-8. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

Figure 5:
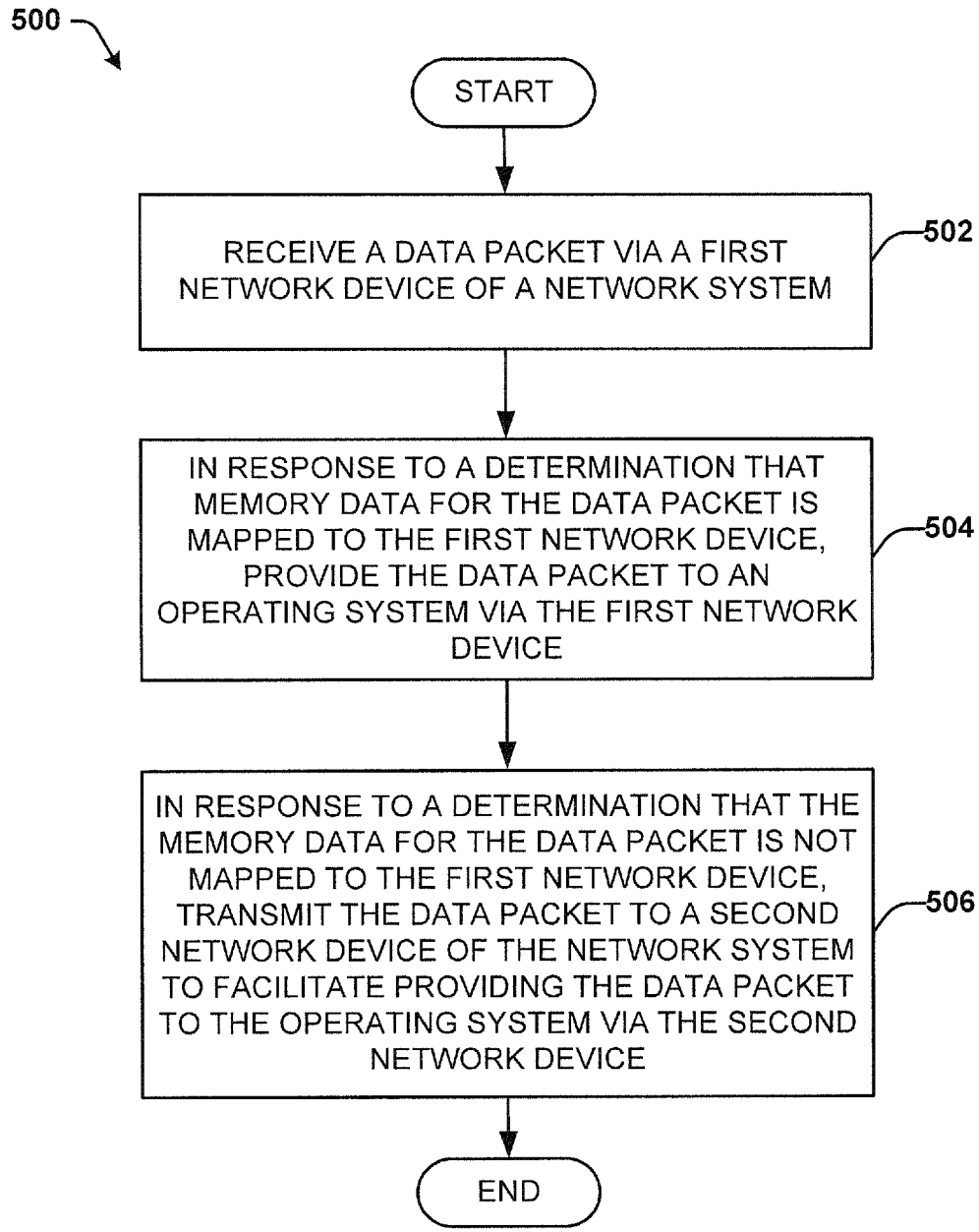
FIG. 5 illustrates a flow diagram of an example, non-limiting embodiment of a method for providing memory coherency across network devices.

Referring to FIG. 5, a flow diagram of an example, non-limiting embodiment of a method 500 for providing memory coherency across network devices is shown. Method 500 can be associated with a network system (e.g., the system 100, the system 200, the system 300 or the system 400). Furthermore, method 500 can be associated with a network device (e.g., the network device 102 or the network device 302). Method 500 can begin at block 502, where a data packet is received via a first network device of a network system. The first network device can be, for example, a network node that manages a set of virtual machines (e.g., a set of virtual computers). The first network device can be associated with a network address (e.g., an Internet Protocol (IP) address). Furthermore, the first network device can be implemented as a SoC. The data packet can be received from a network such as, for example, an Ethernet network. In one example, the data packet can be received from a coherent optical network. In an aspect, the data packet can be stored in a first memory (e.g., a virtual machine buffer) associated with the first network device.

At block 504, in response to a determination that memory data for the data packet is mapped to the first network device, the data packet is provided to an operating system via the first network device. For example, in response to a determination that a memory page (e.g., an operating system buffer page) for the data packet is mapped to the first network device, the data packet can be handed off to an operating system via the first network device. In another example, in response to a determination that a virtual machine associated with the data packet is maintained by the first network device (e.g., processor core(s) of the first network device), the data packet can be handed off to an operating system via the first network device. The operating system can be associated with a set of virtual machines (e.g., a set of virtual computers). In an implementation, a virtual address associated with the data packet can be translated into a physical address. The physical address of the data packet can then be compared to a physical memory map for the first network device to determine whether the data packet is mapped to the first network device. In response to a determination (e.g., based on the physical memory map for the first network device) that the data packet is mapped to the first network device, the data packet can be provided to the operating system via the first network device. In an aspect, in response to a determination that memory data for the data packet is mapped to the first network device, the data packet can be stored in a second memory (e.g., an operating system buffer) associated with the first network device.

At block 506, in response to a determination that the memory data for the data packet is not mapped to the first network device, the data packet is transmitted to a second network device of the network system to facilitate providing the data packet to the operating system via the second network device. For example, in response to a determination that the memory page (e.g., the operating system buffer page) for the data packet is not mapped to the first network device, the data packet can be transmitted to a second network device of the network system to facilitate handoff of the data packet to the operating system via the second network device. In another example, in response to a determination that a virtual machine associated with the data packet is not maintained by the first network device (e.g., not maintained by processor core(s) of the first network device), the data packet can be transmitted to a second network device of the network system to facilitate handoff of the data packet to the operating system via the second network device. The second network device can be, for example, a network node that manages the set of virtual machines associated with the first network device and/or one or more other virtual machines. The second network device can be associated with another network address (e.g., another IP address) that is different than the network address associated with the first network device. Furthermore, the first network device can be implemented as another SoC that is different than the SoC associated with the first network device. The second network device can be coupled to the first network device via a network communication channel (e.g., an Ethernet connection such as, for example, a 10G interface connection). For example, the data packet can be transmitted via a communication channel coupled between a first network interface controller associated with the first network device and a second network interface controller associated with the second network device. In an aspect, the second network device can provide the data packet to the operating system without determining whether (e.g., without performing an analysis process to determine whether) the data packet is mapped to the second network device. In another aspect, the data packet received by the second network device can be stored in a third memory (e.g., an operating system buffer) associated with the second network device.

Figure 6:
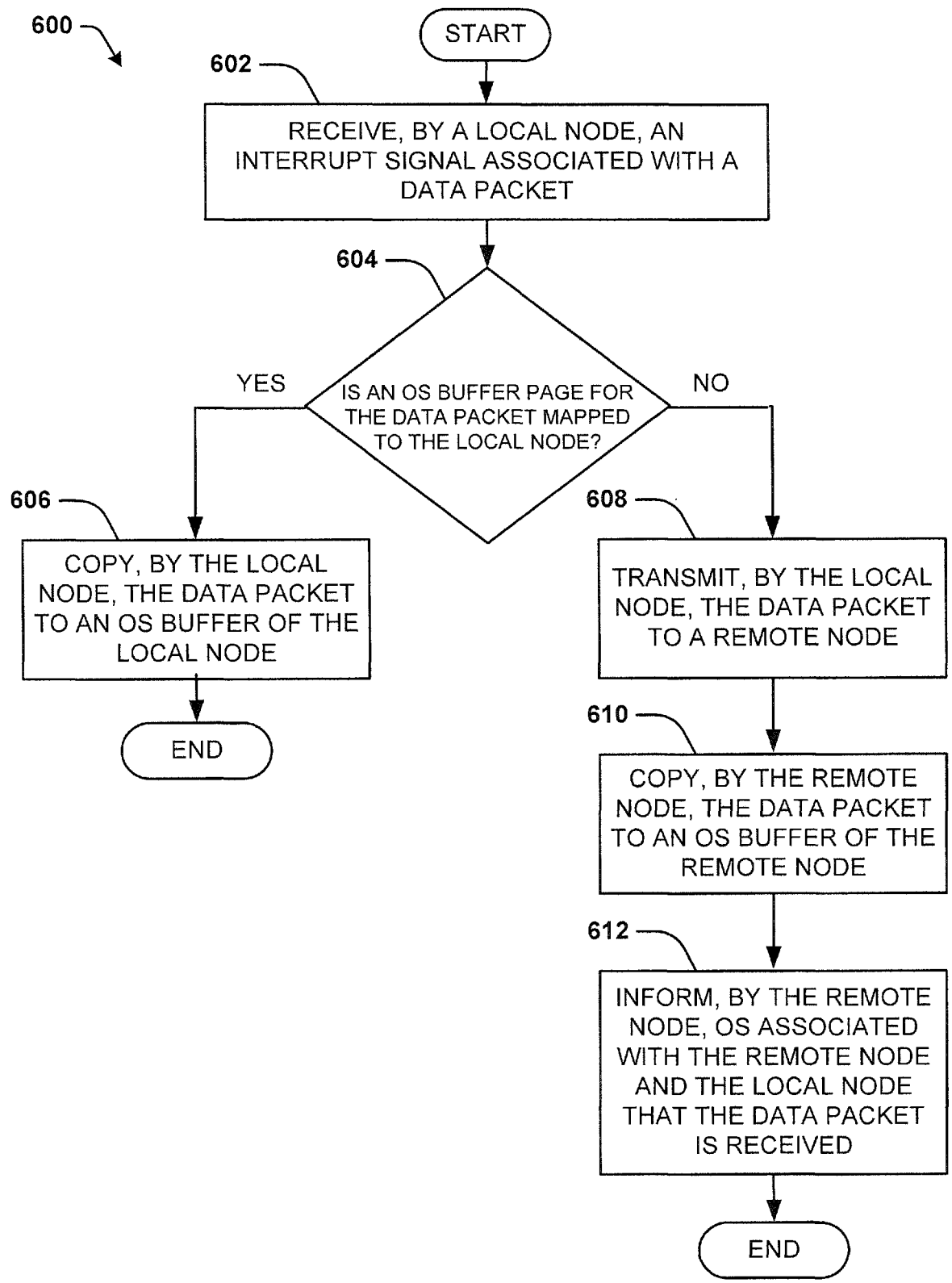
FIG. 6 illustrates a flow diagram of an example, non-limiting embodiment of a method for managing a data packet associated with a virtual computer system.

Referring to FIG. 6, a flow diagram of an example, non-limiting embodiment of a method 600 for managing a data packet associated with a virtual computer system is shown. Method 600 can be associated with a network system (e.g., the system 100, the system 200, the system 300 or the system 400). Furthermore, method 600 can be associated with a network device (e.g., the network device 102, the network device 104, the network device 302 or the network device 304). In an aspect, method 600 can be associated with a virtual machine manager (e.g., the virtual machine manager 116, the virtual machine manager 126, the virtual machine manager 314 or the virtual machine manager 326). Method 600 can begin at block 602, where an interrupt signal associated with a data packet is received by a local node. For example, the interrupt signal can be generated by a network interface controller (e.g., a hardware network interface controller) of the local node in response to receiving the data packet and/or storing the data packet in a buffer. At block 604, it is determined whether an operating system (OS) buffer page for the data packet is mapped to the local node. For example, it can be determined whether a portion of the OS associated with the local node manages a virtual machine associated with the data packet. If yes, method 600 proceeds to block 606. If no, method 600 proceeds to block 608.

At block 606, the data packet is copied by the local node to an OS buffer of the local node. For example, the local node can provide the data packet to the OS to facilitate processing of the data packet by a virtual machine associated with the OS. Then, method 600 ends.

At block 608, the data packet is transmitted, by the local node, to a remote node. For example, the data packet can be transmitted to a remote node that is coupled to the local node. The remote node can also maintain another portion of the OS to manage one or more virtual machines. At block 610, the data packet is copied, by the remote node, to an OS buffer of the remote node. For example, the data packet can be stored by the OS and/or provided to the OS without analyzing the data packet to facilitate processing of the data packet by a virtual machine associated with the OS. At block 612, an OS associated with the remote node and the local node is informed, by the remote node, that the data packet is received. For example, the remote node can inform the portion of the OS associated with the local node and/or the portion of the OS associated with the remote node that the data packet is available for processing by a virtual machine associated with the OS. Then, method 600 ends.

Figure 7:
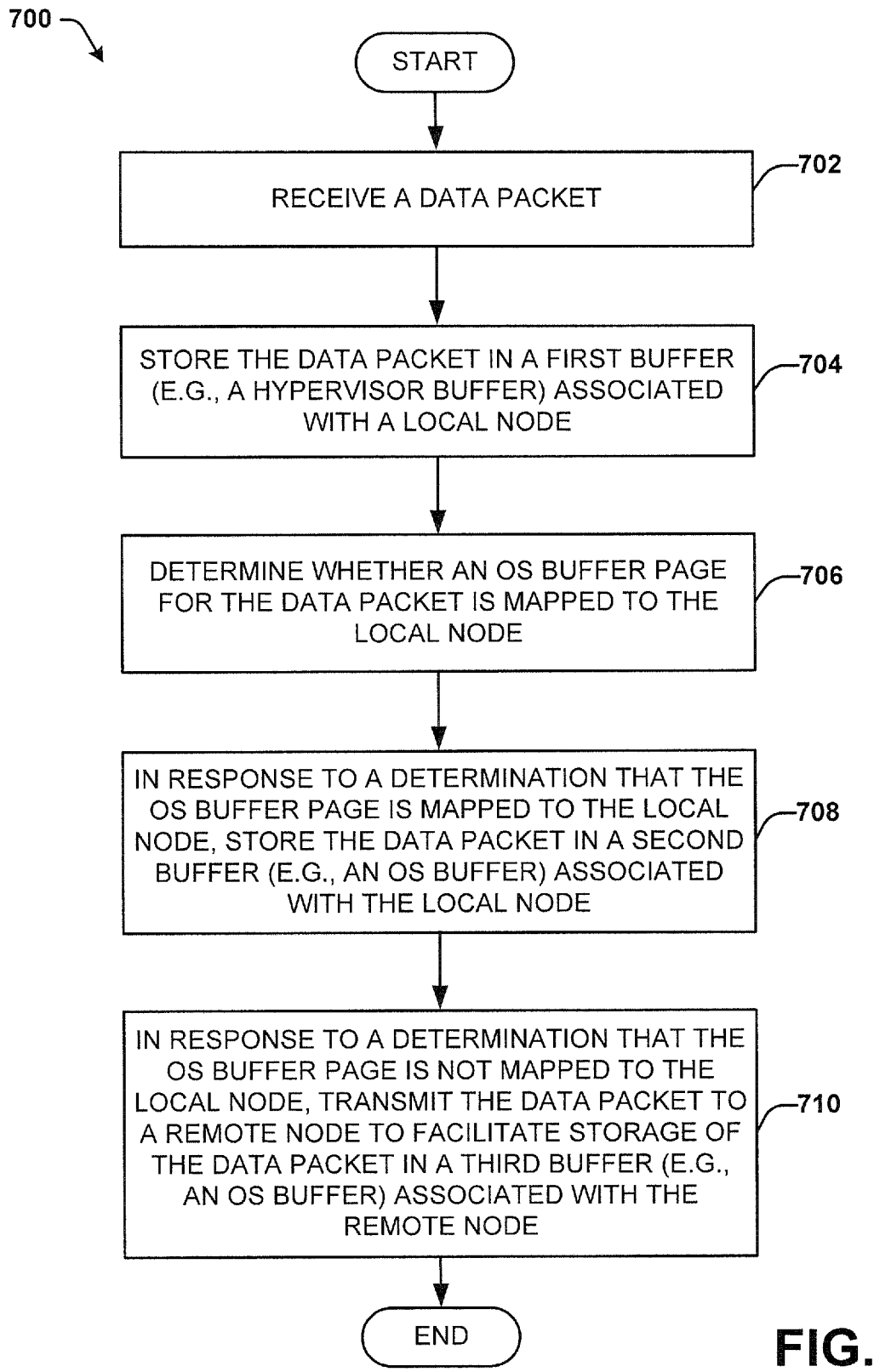
FIG. 7 illustrates a flow diagram of an example, non-limiting embodiment of a method for managing storage of a data packet with respect to a group of network devices.

Referring to FIG. 7, a flow diagram of an example, non-limiting embodiment of a method 700 for managing storage of a data packet with respect to a group of network devices is shown. Method 700 can be associated with a network system (e.g., the system 100, the system 200, the system 300 or the system 400). Furthermore, method 700 can be associated with a network device (e.g., the network device 102 or the network device 302). Method 700 can begin at block 702, where a data packet is received. In one example, the data packet can be received via a network (e.g., an external network). In another example, the data packet can be generated by a processor core of a network device. At block 704, the data packet is stored in a first buffer (e.g., a hypervisor buffer) associated with a local node. The local node can be a network node that received the data packet. Furthermore, the first buffer can be a temporary storage for the data packet while the data packet is analyzed by the local node.

At block 706, it is determined whether an OS buffer page for the data packet is mapped to the local node. For example, it can be determined whether an operating system maintained by the first node manages a virtual machine associated with the data packet.

At block 708, in response to a determination that the OS buffer page is mapped to the local node, the data packet is stored in a second buffer (e.g., an OS buffer) associated with the local node. For example, in response to a determination that an operating system maintained by the first node manages a virtual machine associated with the data packet, the data packet can be stored in the second buffer associated with the local node. The second buffer can be associated with an operating system maintained by the first node. For example, the second buffer can store data packets to be processed by the operating system (e.g., a virtual machine associated with the operating system) maintained by the first node.

At block 710, in response to a determination that the OS buffer page is not mapped to the local node, the data packet is transmitted to a remote node to facilitate storage of the data packet in a third buffer (e.g., an OS buffer) associated with the remote node. For example, in response to a determination that an operating system maintained by the first node does not manage a virtual machine associated with the data packet, the data packet can be transmitted to the remote node to facilitate storage of the data packet in the third buffer associated with the remote node. The third buffer can be associated with an operating system maintained by the second node. For example, the second buffer can store data packets to be processed by the operating system (e.g., a virtual machine associated with the operating system) maintained by the remote node. In an aspect, the remote node can maintain a different portion of the operating system maintained by the local node (e.g., the operating system can be distributed between the local node and the remote node).

Figure 8:
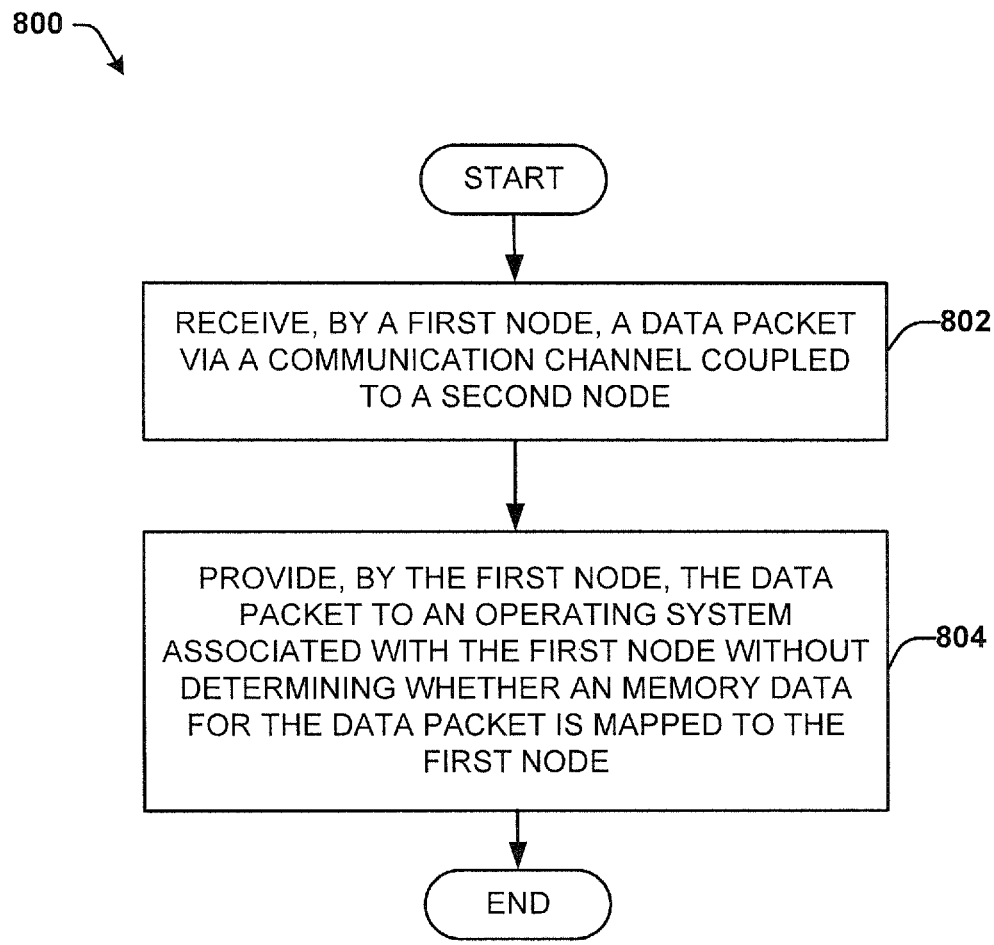
FIG. 8 illustrates a flow diagram of an example, non-limiting embodiment of a method for processing a data packet via a network node.

Referring to FIG. 8, a flow diagram of an example, non-limiting embodiment of a method 800 for processing a data packet via a network node is shown. Method 800 can be associated with a network system (e.g., the system 100, the system 200, the system 300 or the system 400). Furthermore, method 800 can be associated with a network device (e.g., the network device 104 or the network device 304). Method 800 can begin at block 802, where a data packet is received by a first node and via a communication channel coupled to a second node. For example, the first node and the second node can be coupled via a network connection (e.g., an Ethernet connection). The first node can be a first network device associated with a first SoC and the second node can be a second network device associated with a second SoC. Furthermore, the first node can be associated with a first network address (e.g., a first IP address) and the second node can be associated with a second network address (e.g., a second IP address).

At block 804, the data packet is provided, by the first node, to an operating system associated with the first node without determining whether memory data for the data packet is mapped to the first node. For example, the first node can be configured to store the data packet and/or provide the data packet to the operating system without analyzing the data packet. In an aspect, the first node can hand the data packet off to the operating system associated with the first node without determining whether an OS buffer page for the data packet is mapped to the first node.

Example Computing Environment

Figure 9:
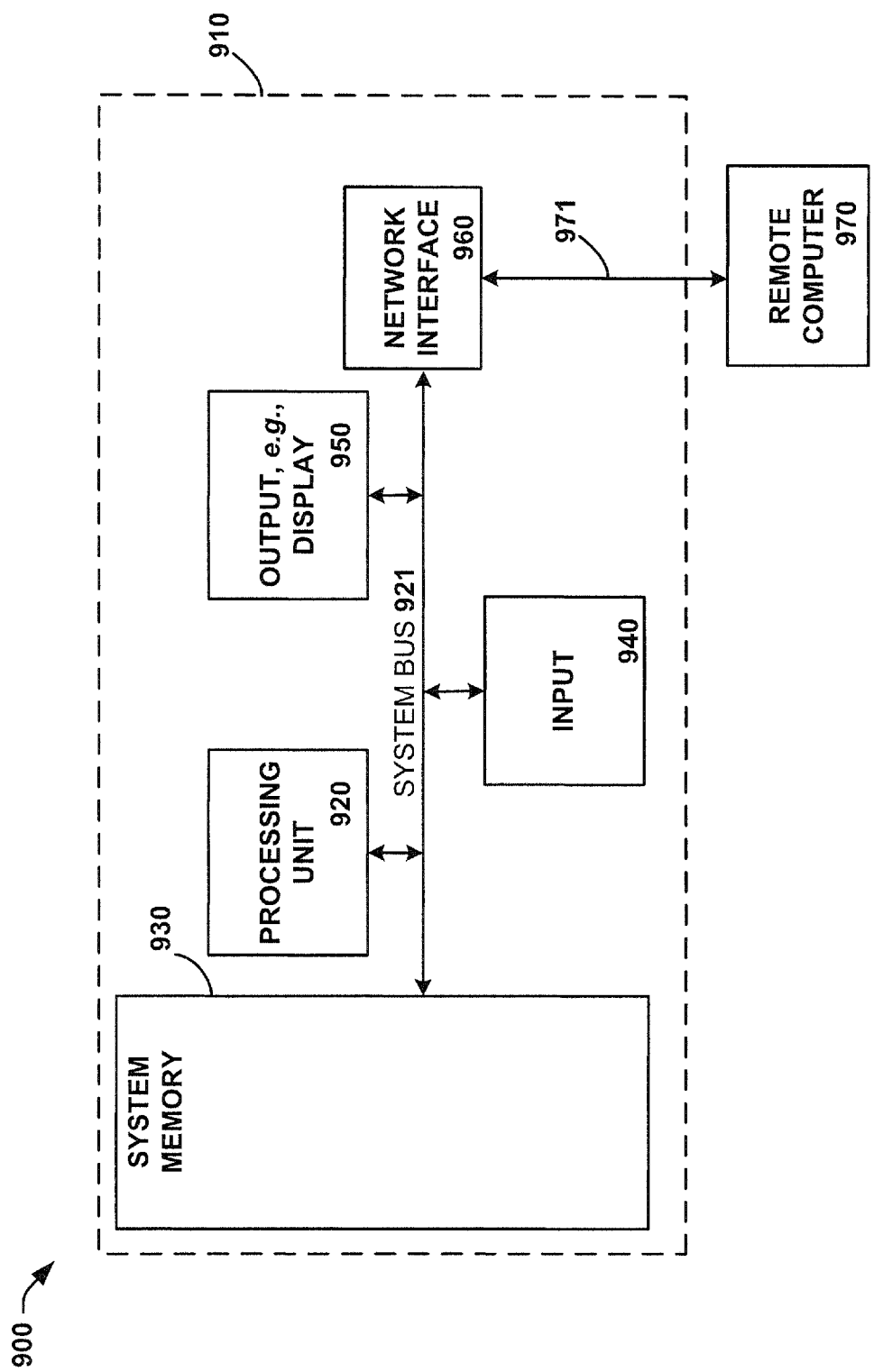
FIG. 9 illustrates a block diagram of an example electronic computing environment that can be implemented in conjunction with one or more aspects described herein.

As mentioned, advantageously, the techniques described herein can be applied to any device where it is desirable to manage memory in virtual computer system and/or a network system. It is to be understood, therefore, that handheld, portable and other computing devices and computing objects of all kinds are contemplated for use in connection with the various non-limiting embodiments, i.e., anywhere that a device may wish to manage memory in virtual computer system and/or a network system. Accordingly, the below general purpose remote computer described below in FIG. 9 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 9 thus illustrates an example of a suitable computing system environment 900 in which some aspects of the disclosed subject matter can be implemented, although as made clear above, the computing system environment 900 is only one example of a suitable computing environment for a device and is not intended to suggest any limitation as to the scope of use or functionality of the disclosed subject matter. Neither should the computing environment 900 be interpreted as having any dependency or requirement relating to any one or combination of components illustrated in the exemplary operating environment 900.

With reference to FIG. 9, an exemplary device for implementing the disclosed subject matter includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures.

Computer 910 typically includes a variety of computer readable media. Computer readable media can be any available media that can be accessed by computer 910. By way of example, and not limitation, computer readable media can comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 910. Communication media typically embodies computer readable instructions, data structures, program modules, or other data in a modulated data signal such as a carrier wave or other transport mechanism and includes any information delivery media.

The system memory 930 may include computer storage media in the form of volatile and/or nonvolatile memory such as read only memory (ROM) and/or random access memory (RAM). A basic input/output system (BIOS), containing the basic routines that help to transfer information between elements within computer 910, such as during start-up, may be stored in memory 930. Memory 930 typically also contains data and/or program modules that are immediately accessible to and/or presently being operated on by processing unit 920. By way of example, and not limitation, memory 930 may also include an operating system, application programs, other program modules, and program data.

The computer 910 may also include other removable/non-removable, volatile/nonvolatile computer storage media. For example, computer 910 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 921 through a non-removable memory interface such as an interface, and a magnetic disk drive or optical disk drive is typically connected to the system bus 921 by a removable memory interface, such as an interface.

A user can enter commands and information into the computer 910 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 920 through user input 940 and associated interface(s) that are coupled to the system bus 921, but may be connected by other interface and bus structures, such as a parallel port, game port, or a universal serial bus (USB). A graphics subsystem can also be connected to the system bus 921. A projection unit in a projection display device, or a HUD in a viewing device or other type of display device can also be connected to the system bus 921 via an interface, such as output interface 950, which may in turn communicate with video memory. In addition to a monitor, computers can also include other peripheral output devices such as speakers which can be connected through output interface 950.

The computer 910 can operate in a networked or distributed environment using logical connections to one or more other remote computer(s), such as remote computer 970, which can in turn have media capabilities different from computer 910. The remote computer 970 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 910. The logical connections depicted in FIG. 9 include a network 971, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 910 can be connected to the LAN 971 through a network interface or adapter. When used in a WAN networking environment, the computer 910 can typically include a communications component, such as a modem, or other means for establishing communications over the WAN, such as the Internet. A communications component, such as wireless communications component, a modem and so on, which can be internal or external, can be connected to the system bus 921 via the user input interface of input 940, or other appropriate mechanism. In a networked environment, program modules depicted relative to the computer 910, or portions thereof, can be stored in a remote memory storage device. It will be appreciated that the network connections shown and described are exemplary and other means of establishing a communications link between the computers can be used.

Example Networking Environment

Figure 10:
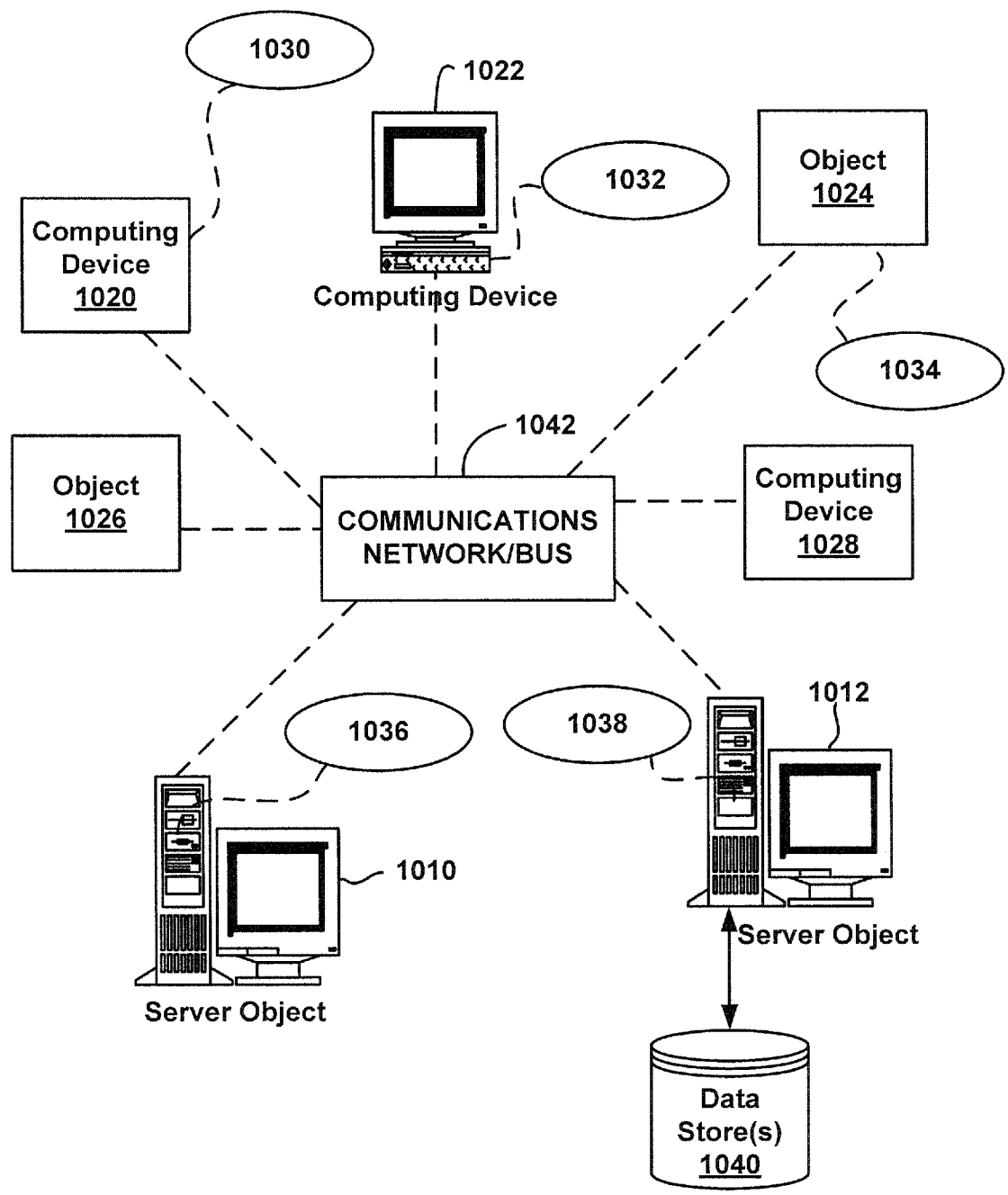
FIG. 10 illustrates a block diagram of an example data communication network that can be operable in conjunction with various aspects described herein.

FIG. 10 provides a schematic diagram of an exemplary networked or distributed computing environment. The distributed computing environment comprises computing objects 1010, 1012, etc. and computing objects or devices 1020, 1022, 1024, 1026, 1028, etc., which may include programs, methods, data stores, programmable logic, etc., as represented by applications 1030, 1032, 1034, 1036, 1038 and data store(s) 1040. It can be appreciated that computing objects 1010, 1012, etc. and computing objects or devices 1020, 1022, 1024, 1026, 1028, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1040 can include memory or other similar data stores as disclosed herein.

Each computing object 1010, 1012, etc. and computing objects or devices 1020, 1022, 1024, 1026, 1028, etc. can communicate with one or more other computing objects 1010, 1012, etc. and computing objects or devices 1020, 1022, 1024, 1026, 1028, etc. by way of the communications network 1042, either directly or indirectly. Even though illustrated as a single element in FIG. 10, communications network 1042 may comprise other computing objects and computing devices that provide services to the system of FIG. 10, and/or may represent multiple interconnected networks, which are not shown. Each computing object 1010, 1012, etc. or computing object or devices 1020, 1022, 1024, 1026, 1028, etc. can also contain an application, such as applications 1030, 1032, 1034, 1036, 1038, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 10, as a non-limiting example, computing objects or devices 1020, 1022, 1024, 1026, 1028, etc. can be thought of as clients and computing objects 1010, 1012, etc. can be thought of as servers where computing objects 1010, 1012, etc., acting as servers provide data services, such as receiving data from client computing objects or devices 1020, 1022, 1024, 1026, 1028, etc., storing of data, processing of data, transmitting data to client computing objects or devices 1020, 1022, 1024, 1026, 1028, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1042 or bus is the Internet, for example, the computing objects 1010, 1012, etc. can be Web servers with which other computing objects or devices 1020, 1022, 1024, 1026, 1028, etc. communicate via any of a number of known protocols, such as the hypertext transfer protocol (HTTP). Computing objects 1010, 1012, etc. acting as servers may also serve as clients, e.g., computing objects or devices 1020, 1022, 1024, 1026, 1028, etc., as may be characteristic of a distributed computing environment.

Reference throughout this specification to "one embodiment," "an embodiment," "an example," "a disclosed aspect," or "an aspect" means that a particular feature, structure, or characteristic described in connection with the embodiment or aspect is included in at least one embodiment or aspect of the present disclosure. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "engine," "architecture" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system for providing memory coherency across plurality of network nodes in a network system, the system comprising:
 a first network node of the plurality of network nodes configured for:
  receiving, via a first network interface controller of the first network node, a data packet from an external system using a first communication channel between the network system and the external system, wherein the first network interface controller is configured to access the first communication channel on behalf of the network system;
  determining whether memory data for the data packet is mapped to the first network node; and
  in response to a determination that the memory data for the data packet is not mapped to the first network node, transmitting, via a second network interface controller of the first network node, the data packet over a second communication channel between the plurality of network nodes, wherein the second network interface controller is configured to access the second communication channel on behalf of the first network node; and
 a second network node of the plurality of network nodes configured for receiving the data packet via the second communication channel and providing the data packet to an operating system associated with the first network node and the second network node.

2. The system of claim 1, wherein the determining whether the memory data for the data packet is mapped to the first network node comprises determining whether a memory buffer page associated with the operating system is mapped to the first network node.

3. The system of claim 1, wherein the determining whether the memory data for the data packet is mapped to the first network node comprises determining whether a virtual machine associated with the data packet is not maintained by the first network node.

4. The system of claim 1, wherein the first network node is configured for providing the data packet to the operating system in response to a determination that the memory data for the data packet is mapped to the first network node.

5. The system of claim 1, wherein the second network node is configured for providing status data for the data packet to the first network node in response to the providing the data packet to the operating system.

6. The system of claim 1, wherein the first network node is configured for storing the data packet in a first buffer associated with the first network node in response to the receiving the data packet via the first network interface controller.

7. The system of claim 6, wherein the second network node is configured for storing the data packet in a second buffer associated with the second network node in response to the receiving the data packet via the second communication channel.

8. The system of claim 6, wherein the first network node is configured for storing the data packet in a second buffer associated with the first network node in response to a determination that the memory data for the data packet is mapped to the first network node.

9. The system of claim 1, wherein a first portion of the operating system is maintained by the first network node and a second portion of the operating system is maintained by the second network node.

10. The system of claim 1, wherein the operating system is associated with a set of virtual machines.

11. The system of claim 1, wherein the first network node is a first system on a chip (SoC) and the second network node is a second SoC.

12. A method for providing memory coherency across a plurality of network devices in a network system, the method comprising:
 receiving, via a first network interface controller of a first network device, data packet from an external system using a first communication channel between the external system and the network system, wherein the first network interface controller is configured to access the first communication channel on behalf of the network system;
 determining whether memory data for the data packet is mapped to the first network device;
 in response determining that the memory data for the data packet is mapped to the first network device, providing the data packet to an operating system via the first network device; and
 in response to determining that the memory data for the data packet is not mapped to the first network device, transmitting, via a second network interface controller of the first network device, the data packet to a second network device of the plurality of network devices using a second communication channel between the plurality of network devices to facilitate providing the data packet to the operating system via the second network device, wherein the second network interface controller is configured to access the second communication channel on behalf of the first network device.

13. The method of claim 12, wherein the determining whether the memory data for the data packet is mapped to the first network device comprises determining whether a memory buffer page associated with the operating system is mapped to the first network device.

14. The method of claim 12, wherein the determining whether the memory data for the data packet is mapped to the first network device comprises determining whether a virtual machine associated with the data packet is maintained by the first network device.

15. The method of claim 12, wherein the receiving the data packet comprises storing the data packet in a first memory associated with the first network device.

16. The method of claim 15, wherein the providing the data packet to the operating system via the first network device comprises storing the data packet in a second memory associated with the operating system.

17. The method of claim 12, wherein a first portion of the operating system is maintained by the first network node and a second portion of the operating system is maintained by the second network node.

18. A network device in a network system with a plurality of network devices, comprising:
 a first network interface controller configured for receiving a data packet from an external system using a first communication channel between the network system and the external system, storing the data packet in a memory buffer, and generating an interrupt signal in response to storing the data packet in a memory buffer, wherein the first network interface controller is configured to access the first communication channel on behalf of the network system;

a second interface controller; and a virtual machine manager configured for receiving the interrupt signal, determining whether a memory page for a data packet is mapped to the network device, providing the data packet to an operating system associated with the network device in response to a determination that the memory page for the data packet is mapped to the network device, and facilitating transmission of the data packet, via the second network interface controller, to another network device in the network system using a second communication channel between the plurality of network devices in response to a determination that the memory page for the data packet is not mapped to the network device, wherein the second network interface controller is configured to access the second communication channel on behalf of the network devcie.

19. The network device of claim 18, wherein the virtual machine manager is configured for storing the data packet in a memory buffer associated with the operating system in response to the determination that the memory page for the data packet is mapped to the network device.

20. The network device of claim 18, wherein the virtual machine manager is configured for providing the data packet to an operating system associated with the network device in response to a determination that a virtual machine associated with the data packet is maintained by a processor core associated with the network device.

* * * * *